(12) United States Patent
Kim et al.

(10) Patent No.: US 9,527,953 B2
(45) Date of Patent: Dec. 27, 2016

(54) CONTINUOUS PREPARATION FOR POLYESTER

(71) Applicant: Samsung Electronics Co., Ltd., Suwon-si, Gyeonggi-do (KR)

(72) Inventors: In-Ki Kim, Hwaseong-si (KR); Eun Ha Park, Seoul (KR); Ha Il Kwon, Incheon-si (KR); Seung Joon Hwang, Seoul (KR); Moo Ho Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 244 days.

(21) Appl. No.: 14/083,936

(22) Filed: Nov. 19, 2013

(65) Prior Publication Data

US 2014/0142272 A1 May 22, 2014

(30) Foreign Application Priority Data

Nov. 19, 2012 (KR) .......... 10-2012-0131180
Dec. 14, 2012 (KR) .......... 10-2012-0146023

(51) Int. Cl.
  *C08G 63/78* (2006.01)
  *C08L 67/02* (2006.01)
  *C08G 63/685* (2006.01)

(52) U.S. Cl.
  CPC ........... *C08G 63/78* (2013.01); *C08G 63/6854* (2013.01); *C08L 67/02* (2013.01)

(58) Field of Classification Search
  CPC .... C08G 63/6854; C08J 2367/02; C08L 67/02
  See application file for complete search history.

(56) References Cited

U.S. PATENT DOCUMENTS

| | | |
|---|---|---|
| 5,015,789 A | 5/1991 | Arntz et al. |
| 5,276,201 A | 1/1994 | Haas et al. |
| 5,284,979 A | 2/1994 | Haas et al. |
| 5,334,778 A | 8/1994 | Haas et al. |
| 5,633,362 A | 5/1997 | Nagarajan et al. |
| 5,686,276 A | 11/1997 | Laffend et al. |
| 5,945,570 A | 8/1999 | Arhancet et al. |
| 6,277,947 B1 | 8/2001 | Kelsey et al. |
| 6,342,646 B1 | 1/2002 | Haas et al. |
| 6,620,502 B1 * | 9/2003 | Fujimoto et al. ............. 428/357 |
| 6,887,953 B2 | 5/2005 | Eng |
| 7,132,484 B2 | 11/2006 | Giardino et al. |
| 7,431,893 B1 | 10/2008 | Nakamoto et al. |
| 7,695,943 B2 | 4/2010 | Sarcabal et al. |
| 2002/0107348 A1 * | 8/2002 | Giardino et al. ............. 526/265 |
| 2003/0220465 A1 | 11/2003 | Giardino et al. |
| 2004/0072983 A1 | 4/2004 | Eng |
| 2005/0165178 A1 | 7/2005 | Giardino et al. |
| 2010/0137655 A1 | 6/2010 | Soucaille |

FOREIGN PATENT DOCUMENTS

| | | |
|---|---|---|
| EP | 0 648 273 B1 | 8/1996 |
| EP | 1261658 B1 | 10/2003 |
| KR | 1020020075409 A | 10/2002 |
| KR | 1020020075410 A | 10/2002 |
| KR | 1020050057633 A | 6/2005 |
| WO | WO 93/25696 A1 | 12/1993 |

* cited by examiner

Primary Examiner — Gregory Listvoyb
(74) Attorney, Agent, or Firm — Leydig, Voit & Mayer, Ltd.

(57) ABSTRACT

A process of continuous production for polyester, comprising continuously supplying an esterification or transesterification product comprising ester oligomers with an acid value of less than 100 meq/kg to a liquid phase polymerization reactor, wherein the esterification or transesterification product is produced by esterification or transesterification of a polycarboxylic acid or an alkyl ester thereof and a polyhydric alcohol; and performing a liquid-phase polymerization at a temperature of 200 to 270° C. and at a pressure of 0 to 5 torr in a liquid-phase polymerization reactor to produce the polyester with an intrinsic viscosity of 0.4 dl/g or higher.

17 Claims, 4 Drawing Sheets

CONTINUOUS PREPARATION FOR POLYESTER

CROSS-REFERENCE TO RELATED APPLICATIONS

This application claims the benefit of Korean Patent Application No. 10-2012-0131180, filed on Nov. 19, 2012, and Korean Patent Application No. 10-2012-0146023 filed on Dec. 14, 2012 in the Korean Intellectual Property Office, the entire disclosures of which are incorporated herein by reference.

BACKGROUND OF THE INVENTION

Field of the Invention

The present invention relates to a process of continuous preparation for polyester, more specifically, a process of continuous production for polyester including performing a liquid-phase polymerization under the reduced pressure in the polymerization reactor with continuously supplying an esterification or trans-esterification product with a low acid value, and an apparatus of liquid-phase polymerization capable of being applied for the process.

Description of the Related Art

A general process of producing polyester includes an esterification or trans-esterification of a dicarboxylic acid and a diol compound, pre-polymerization (precondensation), polymerization and optionally solid-phase polymerization. As the esterification or trans-esterification goes on, water (byproduct of esterification) or alcohol (byproduct of trans-esterification) is produced and needs to be discharged from the reactor. The precondensation is typically performed at a pressure of 10 to 100 torr while removing water or alcohol, unreacted diol, and/or byproducts from the reactor. Subsequent polymerization is typically performed at a reduced pressure of 0 to 10 torr while removing water, alcohol, unreacted or produced diol and the like from the reactor.

KR 10-713759B discloses a process of continuously producing polytrimethylene terephthalate including at least two-step liquid-phase polymerization including a step of continuously producing a pre-condensation product having an intrinsic viscosity of 5 or higher with a first stream of gaseous byproduct from an esterification product of terephthalic acid and 1,3-propandiol, and a step of producing a liquid-phase polymerization product having an intrinsic viscosity of 0.85 dl/g or higher with a second stream of gaseous byproduct.

U.S. Pat. No. 6,277,947 discloses a process of continuous production for polytrimethylene terephthalate (PTT) including a pre-condensation step performed under a pressure between 2 and 200 mbar and a polycondensation performed under at a pressure of 0.2 to 2.5 mbar, after at least two-step esterification.

However, the processes of continuous production for polyester must include three steps of an esterification or trans-esterification, precondensation and polycondensation performed at a separately-controlled temperature and pressure conditions and require the separate equipment collecting the byproducts produced at each step, thereby increasing the equipment cost and the production cost. Accordingly, there is a need for a simplified process and a production apparatus with an easy control of the reaction conditions.

SUMMARY OF THE INVENTION

Provided is a process of continuous production for polyester including performing a liquid-phase polymerization under the pressure of 0 to 5 torr in the polymerization reactor, with continuously supplying an esterification or trans-esterification product containing ester oligomers with an acid value of 100 milliequivalents per kilogram (meq/kg) or lower, to produce the polyester with an intrinsic viscosity (IV) of 0.4 deciliters per gram (dl/g) or higher, and an apparatus of liquid-phase polymerization capable of being applied for the process.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
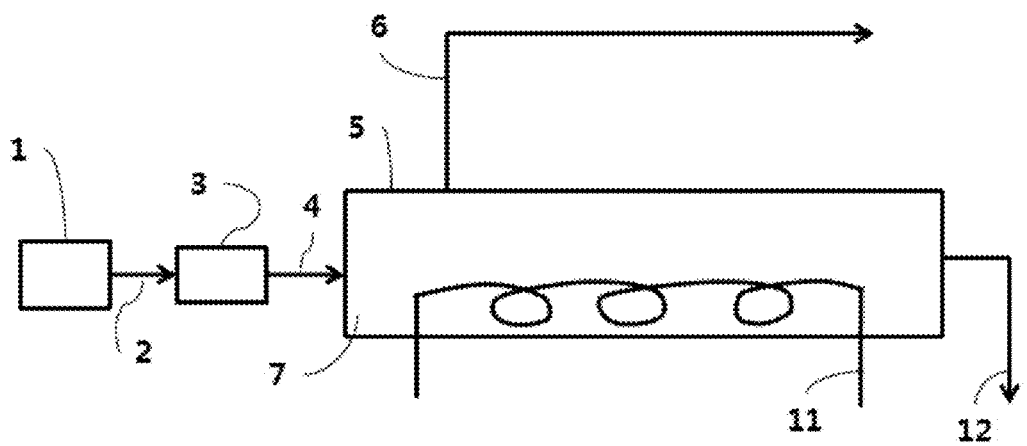
FIG. 1 is a schematic view depicting a process of preparing a polyester using a liquid-phase polymerization reactor with a polymerizing section.

An embodiment of the present invention is to provide a process of continuous production for polyester, including performing a liquid-phase polymerization at a temperature of 200 to 270° C. and at a pressure of 0 to 5 torr in a liquid-phase polymerization reactor, while continuously supplying an esterification or trans-esterification product containing ester oligomers with an acid value of 100 meq/kg or lower, produced from polycarboxylic acid or an alkyl ester compound thereof and polyhydric alcohol through esterification or trans-esterification reaction, into the polymerization reactor, to produce the polyester with an intrinsic viscosity of 0.4 dl/g or higher.

In accordance with an embodiment of the present invention, the process does not require a pre-polymerization step, which is carried out at a pressure of 10 to 100 torr in the prior art, and thus includes one-step polymerization reaction performed at a pressure of 0 to 5 torr without a separate liquid-phase pre-polymerization reactor. The pre-polymerization in the prior art must be performed before polymerization to adjust the condition of the esterification product making it suitable for polymerization because the esterification product includes unreacted starting materials such as diol and byproducts such as water and alcohol.

In accordance with further embodiment, the starting material for the polymerization is an esterification or trans-esterification product with an acid value of 100 meq/kg or lower which may be prepared by reacting a polycarboxylic acid or an alkyl ester thereof with a polyhydric alcohol through esterification or trans-esterification reaction. The starting material is supplied to the liquid-phase polymerization reactor and undergoes the polymerization reaction, thereby forming one stream of gaseous byproduct. The present invention can remove the need for the independent control of temperature and pressure at each reaction step of pre-condensation and polymerization, and for a separate collecting device of gaseous byproduct at each step, and thus provide a simple and easily-controlled process of producing the polyester as well as the cost reduction.

In other words, the esterification or trans-esterification product containing ester oligomers with an acid value of 100 meq/kg or lower is used as a reactant for polymerization, and the amount of the byproducts such as water (esterification) and/or alcohol (trans-esterification) can be reduced. Accordingly, the liquid-phase polymerization can be performed with controlling the pressure of polymerization reactor to a very low value for a short time, resulting in achieving the cost reduction and easier operation of polymerization, compared with the conventional process including a pre-condensation and polymerization.

In accordance with another embodiment of the present invention, provided is a process of continuous production for polyester, performing a liquid-phase polymerization at a temperature of 200 to 270° C. and at a pressure of 0 to 5 torr in a liquid-phase polymerization reactor, with continuously supplying an esterification or trans-esterification product containing ester oligomers with an acid value of 100 meq/kg or lower, produced from polycarboxylic acid or an alkyl ester compound thereof and polyhydric alcohol through esterification or trans-esterification reaction, into the polymerization reactor, to produce the polyester with an intrinsic viscosity of 0.4 dl/g or higher.

The present inventors found that, when the esterification or trans-esterification product with an acid value of 100 meq/kg or lower is used as a reactant, liquid-phase polymerization can be performed without requiring a pre-polymerization, thereby producing the polyester with a desired specific acid value.

The esterification or trans-esterification product can have an acid value of 100 meq/kg or lower, for examples 95 meq/kg or lower or 90 meq/kg or lower, preferably 70 meq/kg or lower, or more preferably 50 meq/kg or lower.

The term, "acid value" used herein means an equivalent of KOH required for neutralizing an acid component of polyhydric acid or an alkyl ester thereof contained in 1 Kg of sample, and corresponds to mili-equivalent of KOH which is the same as the acid component contained in 1 Kg of sample. The acid value can be calculated according to the following formula.

$$\text{acid value}_{(meq/Kg)} = \frac{(A-B) \times 0.01 \times f}{W}$$

Wherein,
A is an amount of 0.01 N KOH solution added to a sample (μl),
B is an amount of 0.01 N KOH solution added to a blank (μl),
W is an amount of sample (g), and
f is a factor of 0.01 N KOH solution.

The esterification or trans-esterification product with a specific acid value can be obtained by performing the esterification reaction at 99% or higher or preferably 99.5% or higher of an equivalent conversion rate (referred to "conversion rate" hereinafter) using a polycarboxylic acid or an alkyl ester thereof and polyhydric alcohol. For example, if terephthalic acid and 1,3-propandiol reacts at 1.3 of molar ratio of 1,3-propandiol to terephthalic acid (1,3-propandiol/terephthalic acid) with a conversion rate of 99%, the esterification product having about 100 meq/kg can be obtained.

The term "conversion rate" used herein refers to the amount of the added polycarboxylic acid or an alkyl ester thereof that is coverted to the reaction product, and is the percentage of reacted polycarboxylic acid or an alkyl ester thereof esterification or trans-esterification. As the esterification or trans-esterification progresses, the conversion rate of polycarboxylic acid or an alkyl ester thereof increases and the acid value decreases.

$$\text{conversion rate} = \frac{\text{(equivalent weight of initial input polycarboxyilic acid equivalent weight of reacted polycarboxyilic acid)}}{\text{equivalent weight of initial input reacted polycarboxyilic acid}} \times 100$$

The liquid-phase polymerization is carried out by continuously supplying the esterification or trans-esterification product with an acid value of 100 meq/kg or lower, produced from polycarboxylic acid or an alkyl ester compound thereof and polyhydric alcohol through esterification or trans-esterification reaction, into a liquid-phase polymerization reactor.

The polycarboxylic acid refers to a compound having at least two carboxyl groups in a molecule, and includes, for example, a dicarboxylic acid and a tricarboxylic acid. Preferably, the polycarboxylic acid may be dicarboxylic acid. The alkyl ester compound of the polycarboxylic acid includes $C_{1-12}$ alkyl ester or $C_1$-$C_6$ ester such as methyl or ethyl ester, but not limited thereto.

Examples of dicarboxylic acids include linear or branched $C_4$-$C_{12}$ alkyl dicarboxylic acid, $C_3$-$C_{12}$ cycloalkyl dicarboxylic acid, $C_6$-$C_{14}$ aromatic dicarboxylic acid and the like. For example, dicarboxylic acids include aliphatic hydrocarbon dicarboxylic acids such as oxalic acid, malonic acid, succinic acid, glutaric acid, adipic acid, 2,2,5,5-tetramethyl-hexly-dicarboxylic acid, pimelic acid, suberic acid, azelaic acid, sebacic acid, 1,11-undecandicarboxylic acid, 1,10-decandicarboxylic acid, 1,12-dodecandicarboxylic acid, hexadecane dicarboxylic acid, fumaric acid, maleic acid anhydride, maleic acid, and the like; and aromatic dicarboxylic acids such as terephthalic acid, isophthalic acid, phthalic acid, 1,3- or 1,4-cyclohexyl dicarboxylic acid, 4,4'-biphenxyl dicarboxylic acid, 2,6-naphthalienyl dicarboxylic acid, 2,7-naphthalienyl dicarboxylic acid, 1,4-naphthalienyl dicarboxylic acid, 4,4'-methylene bisbenzoic acid, hexahydrophthalic acid, 5-sulfosiophthalic acid, trimellitic acid and the like.

Examples of aromatic dicarboxylic acids include terephthalic acid, isophthalic acid, phthalic acid, 1,3- or 1,4-cyclohexanedicarboxylic acid, 4,4'-biphenyl dicarboxylic acid, 2,6-naphthalenedicarboxylic acid and the like, but not limited thereto. The preferred example of polycarboxylic acid is terephthalic acid or a mixture thereof. Other polycarboxylic acid capable of mixing with terephthalic acid is isophthalic acid, pentanedioic acid, hexanedioic acid and the like, but not limited thereto. Aromatic dicarboxylic acids can be mixed with other polycarboxylic acids. For example, terephthalic acid mixed with other polycarboxylic acid can contained the other polycarboxylic acid in an amount of about 20 mol % or lower, preferably about 10 mol % or lower, or more preferably about 1 mol % per total mole of acid.

The polyhydric alcohol used for esterification or transesterification product refers to a compound containing at least two or three alcohol (OH) groups in a molecule, and preferably is a compound containing two alcohol groups (diol). Examples of diols include 1,3-propandiol, ethylene glycol, 2-methyl-1,3-propandiol, 2,2-dimethyl-1,3-propandiol, and $C_6$-$C_{12}$ diols such as 2,2-diethyl-1,3-propandiol, 2-ethyl-2-(hydroxymethyl)-1,3-propandiol, 1,6-hexanediol, 1,8-octane diol, 1,10-decan diol 1,12-dodecan diol, 1,4-cyclohexane diol, 1,4-cyclohexanedimethanol and the like. Preferred diols include 1,3-propandiol and ethylene glycol. A polyhydric alcohol can be used alone or in combination with other polyhydric alcohols. For instance, a mixture of diols can be used. Alternatively, or in addition, a diol can be mixed with triols such as trimethylolpropan and pentaerythriol. By way of illustration, 1,3-propanol can be used as a mixture with other polyhydric alcohol. The other polyhydric alcohols can be mixed with 1,3-propanol at an amount of, for example, about 20 mol % or lower, preferably 10 mol % or lower or more preferably about 1 mol or lower per total amount of polyhydric alcohol.

1,3-propandiol can be produced by various chemical methods or biological conversion methods. For examples, chemical methods are disclosed in U.S. Pat. No. 5,015,789, U.S. Pat. No. 6,342,646, U.S. Pat. No. 5,945,570, and etc. and biological conversion methods are disclosed in U.S. Pat. No. 5,633,362, US20100137655, EPO 648 273 and etc. The biological method of producing 1,3-propanol include a fermentation method of renewable biomaterial such as grain.

The esterification reaction of the dicarboxylic acid and 1,3-propanol can be carried out with or without a catalyst. Examples of a catalyst used in the esterification or transesterification reaction include an organic or inorganic compound (for examples, oxide, hydroxide, carbonate, phosphate, alkyl derivative, and aryl derivative) of at least one metal selected from titanium, tin, antimony and zirconium.

Specific examples of a catalyst include tetraisopropyl titanate, tetraisobutyl titanate, titanium butoxide, tetraethyl titanate, tetrapropyl titanate, n-butyl succinate, octyl succinate, dibutyltinoxide, dioctyltinoxide, diphenyltinoxide, tri-n-butyltinacetate, tri-n-butyltinchloride, tri-n-butyltinfluororide, triethyltinchloride, triethyltinbromide, triethyltinacetate, trimethyltinhydroxide, triphenyltinchloride, triphenyltinbromide, triphenyltinacetate, or a mixture thereof. Preferably, the catalyst is tetraisopropyl titanate, tetraisobutyl titanate, titanium butoxide, or combination thereof.

The amount of catalyst used in the esterification or trans-esterification is not particularly limited. The amount can be, for example, 0 to 500 ppm, or preferably about 50 to 300 ppm of metal per the amount of used polycarboxylic acid or its ester. The catalyst for esterification reaction can be added at an initial stage together with dicarboxylic acid and 1,3-propandiol, or in the middle of the reaction, and can be added continuously or intermittently, for maintaining the catalyst activity in the process.

The reaction time, temperature and pressure of the esterification or trans-esterification can be adjusted depending on the kinds of polycarboxylic acid or alkyl ester thereof, and the desired polymerization degree. The esterification or trans-esterification can be carried out in a batch-type, semi-continuous type or continuous type process. In the semi-continuous type or continuous type reaction, at least two esterification reactors can be used.

The esterification or trans-esterification reaction can be performed according to a one step reaction, or two or more step reactions under different pressure conditions.

In general, the molar ratio of polyhydric alcohol to polycarboxylic acid or alkyl ester thereof (polyhydric alcohol/polycarboxylic acid or ester) in the esterification or trans-esterification reaction is about 1:1.1 to about 1:2, or preferably about 1:1.2 to about 1:1.5). As the mole of polyhydric alcohol increase, the conversion rate of polycarboxylic acid or alkyl ester thereof to the reaction product increases. Additional polyhydric alcohol may be added at a late stage in order to increase the moles of polyhydric alcohol. The reaction can be conducted at any suitable temperature and pressure. For example, the temperature of esterification or trans-esterification reaction can be about 150 to 260° C., or preferably about 180 to 260° C. The pressure can be about 0.1 to 10 atm (76 to 7600 torr), or preferably about 1 to 5 atm (760 to 3800 torr). The reaction time may be about 1 to 5 hours. As the reaction temperature increases and the reaction time is longer, the conversion rate increases.

When two or more steps of esterification or trans-esterification reaction are employed, the reaction includes a first step of the reaction performed at a pressure of 1 to 5 atm to produce a first reaction product having an acid value of 200 to 1,500 meq/kg, and a second step of the reaction performed at a pressure of 50 to 500 torr, to produce the esterification or trans-esterification having an acid value of 100 meq/kg or lower.

In typical esterification methods, substantial amounts of unreacted terephthalic acid or alkyl ester thereof remains in the esterification reaction product. When the esterification reaction product is used as a reactant for polymerization without pre-polymerization, the unreacted terephthalic acid or alkyl ester thereof produces water or alcohol as a byproduct. The byproduct makes it difficult to achieve a high vacuum in the reactor and to efficiently perform liquid-phase polymerization. By performing at least two steps of esterification controlled under the different reaction conditions, the ester oligomer with a low acid value can be produced while preventing the byproduct production and, thereby, maintaining a high conversion rate, even though a low molar ratio of polyhydric alcohol to polycarboxylic acid is used in the esterification reaction. In addition, the ester oligomer with a low acid value can be used for subsequent polymerization step without pre-polymerization, thereby making the process be simple and reducing the reaction time.

The esterification reaction can be carried out as a single step by using polycarboxylic acid or alkyl ester thereof and polyhydric alcohol as starting materials in the esterification reactor under the pressure of 1 to 5 atm (760 to 3800 torr), to produce the esterification or trans-esterification having an acid value of 100 meq/kg or lower. However, if the reaction product of the first esterification step has an acid value of 200 to 1,500 meq/kg, such as 300 to 600 meq/kg, the first esterification step can be converted to the second esterification step. In the case that the esterification reaction product has an acid value of 1500 meq/kg or higher, the byproducts of water or alcohol cannot be removed efficiently because of the reduced amount of unreacted polyhydric alcohol. Accordingly, as the reaction product in the first esterification step reaches a specific acid value, the second esterification step can be performed preferably by reducing the reaction pressure.

The temperature of first esterification step can be 200 to 260° C., or preferably 220 to 250° C., and the reaction time can be 1 to 5 hours or preferably 2 to 4 hours. The pressure can be 1 to 5 atm (760 to 3800 torr) or preferably 1 to 2 atm (760 to 1520 torr).

In the esterification or trans-esterification reaction of the present invention, the starting materials are preferably added to the reactor during the first esterification step. The starting materials can be added at once (a single "lump" or "bulk" addition) or by splitting into several portions added sequentially. The starting materials can be heated to 200 to 260° C., before or after being supplying to the reactor.

The increased molar ratio of the polyhydric alcohol/polycarboxylic acid can improve the conversion rate of polycarboxylic acid to the reaction product, but the large amount of used polyhydric alcohol increases the byproduct production, thereby decreasing the acid value of product. According to the present invention, although the molar ratio of polyhydric alcohol/polycarboxylic acid (or alkyl ester) is low, it is possible to produce an ester oligomer having a low acid value at higher conversion rate.

In accordance with the present invention, the molar ratio of polyhydric alcohol/(polycarboxylic acid or an alkyl ester thereof) can be 1:1.1 to 1:2, or preferably 1:1.2 to 1:1.5. As the molar ratio is higher, the conversion rate of polycarboxylic acid or alkyl eser thereof to the reaction product is higher. When the molar ratio is higher than 1:2, a large reactor is required and high levels of energy is needed to remove unreacted polyhydric alcohol in the subsequent polymerization step. Also, it is disadvantageous to increase the production of impurities such as dipropylene glycol (DPG). On the other hand, when the molar ratio is lower than 1:1.1], the reaction rate decreases and the polyester with a high molecular weight cannot be obtained in the subsequent polymerization step. In order to increase the molar ratio of polyhydric alcohol, additional polyhydric alcohol can be added to the reactor at a late stage of esterification reaction, for example the first or the second esterification step.

To facilitate the reaction in the first esterification step, the polycarboxylic acid and polyhydric alcohol can be added optionally in the presence of ester oligomers, which can increase the solubility of polycarboxylic acid or alkyl ester thereof.

The reaction product obtained in the first esterification step can be processed in the second esterification step by adjusting the reaction condition. That is, the reaction product obtained in the first esterification step is used as the reactant for the second step as it is, without performing an additional step.

In the second esterification step, the reaction temperature can be 200 to 260° C., or preferably 230 to 250° C., the reaction time can be 0.1 to 3 hours or preferably 0.5 to 2 hours. The reaction pressure can be 50 to 500 torr or preferably 100 to 400 torr, proviso that the pressure of the second reaction step should be lower than the pressure of the first reaction step. If the pressure is lower than 50 torr, the polyhydric alcohol can be removed to the outside of esterification reactor, thereby reducing the reaction rate. If the reaction pressure is higher than 500 torr, the byproducts of water and alcohol cannot be removed to the outside of the esterification reactor, resulting in reduced reaction rate.

The second step can be divided into at least two reactions having a pressure gradient. For example, after the first step, the second step can be carried out firstly at 350 to 500 torr, and then by reducing the pressure to 50 to 350 torr. In the two-step esterification or trans-esterification reaction, the reaction can be performed with removing water (esterification) or alcohol (trans-esterification) continuously or intermittently.

The first and the second esterification steps can be performed in the same reactor or in separate reactors. For example, after the first esterification step, the reaction product can be transferred to another reactor and then be performed by the second esterification step.

In case of the continuous esterification or trans-esterification reaction, the first esterification step can be performed continuously in the presence of the added ester oligomer. At the initial stage of the continuous esterification, the ester oligomer can be added to the esterification reactor in order to stabilize the process.

The esterification reaction product contains the monomer of the polyhydric alcohol connected to both ends of polycarboxylic acid, and the oligomer thereof. The reaction product has an intrinsic viscosity of about 0.02 to 0.3 dL/g or preferably about 0.05 to 0.2 dL/g, and a number-average degree of polymerization (DPn) of 1 to 20 or preferably 3 to 15.

According to the esterification method including at least a two step reaction under different pressure conditions, the 99% or higher of conversion rate of polycarboxylic acid can be achieved by adjusting the molar ratio of the polyhydric alcohol to the polycarboxylic acid. The esterification of the present invention can produce an esterification reaction product having an acid value of lower than 100 meq/kg, for examples 95 meq/kg or lower, 90 meq/kg or lower, 70 meq/kg or lower, or 50 meq/kg or lower.

In accordance with an embodiment, in order to control the content of DPG of the reaction product, the esterification or trans-esterification reaction is carried out with the addition of at least one metal selected from the group consisting of alkaline metals and alkaline earth metals. The metals can function as a controlling agent of DPG production.

The metal added to the esterification or trans-esterification reaction can adjust the content of DPG, particularly lower the DPG content. Because the esterification reaction product with a low content of DPG is supplied to the liquid-phase polymerization process according to the present invention, the polyester containing a minimum amount of impurities such as acrolein and/or aryl alcohol can be obtained. According to the present invention, provided is a process of preparing the polymerization product with a low amount of DPG and impurities such as acrolein and aryl alcohol, by using the at least esterification reaction product with a low acid value.

Examples of metal include at least one selected from the group consisting of Mg, Ca, K and Na. The metal can be provided as an organic or inorganic compound (for examples, oxide, hydroxide, carbonate, phosphate, alkyl derivative, and aryl derivative. When the metal is used as an amount of 1 to 1000 ppm or preferably 20 to 100 ppm per total amount of final polyester, DPG production is inhibited in the esterification reaction, so as to easily reduce the DPG amount to 2 mol % or lower. The metal can be added at the initial stage together with dicarboxylic acid and 1,3-propandiol or in the middle of the reaction, continuously or intermittently.

The DPG is added to the polymer chain, and thus affects the melting point, glass transition temperature, specific gravity, dyeing property, proccessibility and the other physicochemical properties of the polymer. In addition, DPG can be decomposed in a high temperature of the liquid-phase polymerization to produce the toxic materials such as acrolein and aryl alcohol. Accordingly, it is important to minimize the amount of produced DPG economically and efficiently. Preferably, if a reactant for the liquid-phase polymerization is the esterification reaction product containing 2 mol % or lower of DPG per total mole of polyhydric alcohol in the esterification reaction product, the polyester containing 2 mol % or lower of DPG per total mole of polyhydric alcohol in the polyester can be obtained.

As the esterification reaction or trans-esterification reaction goes on, water or non-polyhydric alcohol is produced as a byproduct and is mixed with unreacted polyhydric alcohol in a reactor. In accordance with the present invention, the process further includes a step of converting the polyhydric alcohol mixed in water or non-polyhydric alcohol to gaseous phase, separating the polyhydric alcohol from the water or non-polyhydric alcohol in a condenser or a column separator, and then refluxing the polyhydric alcohol into the reactor and excharging the water or alcohol out of the reactor.

The esterification or trans-esterification product can be used for preparing the polymer including a repeating unit derived from acid and glycol, and for continuously preparing the polyester of the present invention. Specifically, an embodiment of the present invention provide a process of continuous production for polyester which includes a step of polymerizing the esterification reaction product with continuously supplying the esterification reaction product to the liquid-phase polymerization reactor, to produce a gaseous byproduct stream and the polyester with an intrinsic viscosity of 0.4 dl/g or higher reactor.

The reactant for the polymerization is the esterification or trans-esterification product containing ester oligomers with an acid value of lower than 100 meq/kg, for example, 95 meq/kg or lower and 90 meq/kg or lower, preferably 70 meq/kg or lower, or more preferably 50 meq/kg or lower.

The esterification or trans-esterification product with an acid value of lower than 100 meq/kg is used as a reactant for the polymerization. If the acid value is low, water or alcohol is produced in the polymerization at a small amount, it is possible to reach rapidly a high-degree vacuum and to maintain the high vacuum during the polymerization reaction. Specifically, a high vacuum of 5 mmHg or lower can be rapidly achieved in a batch-type polymerization and be continuously maintained in the continuous polymerization. In accordance with the continuous liquid-phase polymerization of the present invention, the pre-polymerization step is not required for the polymerization, thereby being capable of performing the liquid-phase polymerization with forming one gaseous byproduct stream. On the other hand, if the acid value of esterification product is equal to or higher than 100 meq/kg, the large amount of produced water or alcohol in the polymerization blocks the high vacuum of 5 mmHg or lower required for the polymerization, because water and alcohol has a higher vapor pressure than the polyhydric alcohol. The present invention can remove the need of pre-polymerization which is required for the liquid-phase polymerization in the conventional art, thereby reducing the equipment investment and easily operating the polymerization process.

In accordance with an embodiment, one gaseous stream of byproduct is formed in the liquid-phase polymerization of polyester. The one stream means that the reaction can be controlled at the same pressure condition. Nevertheless, one or at least two stream holes can be made in the polymerization reactor to facilitate the removal of gaseous byproduct.

The temperature of polymerization can be 200 to 270° C., or preferably 235 to 265° C., and the reaction pressure can be 0 to 5 torr, or preferably 0 to 2 torr. The liquid-phase polymerization can be performed with maintaining the pressure of 0 to 5 torr.

The liquid-phase polymerization reactor includes at least one or two sections of polymerization. For example, when the reactor includes two sections of polymerization, the temperature increases gradually from an inlet to an outlet of the reactor and the same reaction pressure is preferably maintained. At an initial stage of polymerization, the temperature gradient can prevent the polyhydric alcohol from evaporating rapidly, the polyester from volatilizing with alcohol, and the polyester from decomposing due to the high temperature. After the some extent of polyhydric alcohol decreases, the polyester with a desired intrinsic viscosity can be obtained by elevating reaction temperature.

In accordance with an embodiment, the polymerization reactor includes two sections of polymerization. The two sections are a first section where the polymerization is carried out with separating the untreated polyhydric alcohol at a temperature of 200 to 260° C. or preferably 220 to 250° C. to, and a second section where the polyester with a desired intrinsic viscosity produced at a temperature of 250 to 270° C. by elevating the temperature.

In the two sections of reactor, the first section corresponds to a region at the inlet occupying 30 to 50 vol % total volume of reactor and the second section corresponds to a region at the outlet occupying 50 to 70 vol % total volume of reactor. The viscosity of the materials inside the reactor may be different at regions of inlet and outlet according to the process of polymerization, and thus the reactor can be divided to two sections in order to prevent the flow being unstable. The vol % of the two sections can be determined based on the intrinsic viscosity of the materials in the low viscosity region and the high viscosity region of the reactor. In the first section, the reactant can reside for 10 minutes to 3 hours, or preferably 0.5 to 2 hours. In the second section, the resident time of reactant can be 1 to 5 hours, or preferably 2 to 4 hours. If the resident time exceeds 3 hours, the reactant and product cannot transfer continuously due to the increased viscosity. If the resident time is less than 10 minutes, the agitation efficiency is reduced in the subsequent step due to the low viscosity. In the second section of polymerization, when the resident time exceeds 5 hours, the polyester can be decomposed. When the resident time is less than 1 hour, the desired intrinsic viscosity cannot be obtained.

Any catalyst used for the polymerization can be applied for the present invention without limitation. The same catalyst of esterification can be used for polymerization. For example, the catalysts for the polymerization include titanium, tin, antimony, zirconium and the like, specifically titanium butoxide, but not limited thereto.

The amount of catalyst used for the polymerization is not particularly limited. For example, the amount of metal can be about 50 to 500 ppm per total weight of final polyester obtained after the liquid-phase polymerization, so as to improve the polymerization reaction. The reaction time for polymerization is not limited, but for example, can be about 90 minutes to 7 hours. When the liquid-phase polymerization is carried out at specific reaction temperature, pressure and time, it is possible to control the intrinsic viscosity of polyester to about 0.4 to 1.5 dL/g or preferably 0.6 to 1.2 dL/g, and the water amount of discharged gaseous byproduct to 1.5 wt % or lower.

Besides the esterification reaction product and the catalyst for polymerization, the polymerization reactor may include at least one additive selected from the group consisting of a frosting agent, a modifying agent of dyeing property, a coloring inhibitor, a whitening agent, a stabilizer, a viscosity improver, a pigment, an antioxidant and the like. The additive can be added to the liquid-phase polymerization at an initial stage or in the middle stage of polymerization. The amount of additive is not limited, but, for example, can be 1 to 200 ppm per total weight of polyester obtained after the liquid-phase polymerization.

The stream of gaseous byproduct is formed in the polymerization reaction. The alcohol and other gaseous byproducts produced in the polymerization under the high vacuum of 5 torr or lower are condensed to liquid phase by passing through a low temperature condenser and/or a liquid-phase collector. The gaseous byproducts can be condensed according to the general condensing method, or by a condenser adopting a cooling solvent at a temperature of 0 to 40° C. or preferably 2 to 20° C. The gaseous stream passing through the condenser can be collected by performing addition conventional steps such as a liquid shower spraying step.

In accordance with an embodiment, the process of preparing the polyester further includes a step of performing solid-phase polymerization after solidifying the melted polyester produced in the liquid-phase polymerization.

The polyester obtained in the preparation process according to the present invention can be applied to the process of preparing pellet, fiber, film or mold. The fiber made from the polyester can be used for preparation of various fabrics such as carpet or cloth.

The molded articles of the polyester can be made by various molding methods such as extrusion molding, injection molding and blow molding, and include vessel (e.g. bottle), tile, film, mechanical part and the like.

In accordance with further embodiment of the present invention, provided is an apparatus of liquid-phase polymerization including a reactor equipped with inlet for reactant, an outlet for product, an outlet for discharging a gaseous byproduct, and a heat exchanger, where an esterification or trans-esterification product containing ester oligomers with an acid value of lower than 100 meq/kg, is continuously input into the inlet of reactants through the inlet of reactants and undergoes the liquid-phase polymerization under the pressure of 0 to 5 torr, to produce the polyester with an intrinsic viscosity of 0.4 dl/g or higher.

In accordance with further embodiment, the liquid-phase polymerization reactor includes a reactor equipped with a reactant feeding inlet, an product discharging outlet and an outlet of discharging a gaseous byproduct; and a heat exchanger to the reactor where an esterification or trans-esterification product containing ester oligomers with an acid value of 90 meq/kg or lower, is continuously supplied through the inlet of reactants and undergoes the liquid-phase polymerization under the pressure of 0 to 5 torr, to produce the polyester with an intrinsic viscosity of 0.4 dl/g or higher.

The liquid-phase polymerization reactor comprises at least two polymerization sections, and, for example, two sections are divided by the separating wall which is separated from the exterior wall of reactor so as for the reactant pass through. the two polymerization sections comprise a first section corresponds to a region having 30 to 50 vol % from the inlet of reactor per total volume of reactor and a second section corresponds to a region having 50 to 70 vol % from the outlet of reactor per total volume of reactor.

In accordance with an embodiment, provided is a liquid-phase polymerization reactor in which one stream of gaseous byproduct is formed in the polymerization.

The process of preparing the polyester according to an embodiment of the present invention is shown in FIG. 1. As illustrated in FIG. 1, the reactor includes one polymerization section, one outlet discharging the gaseous stream of byproduct and a heat exchanger.

The esterification or trans-esterification reaction product passes through a supplying pipeline 2, a heat exchanger 3 and a supplying pipeline 4 and then, is supplied to the liquid-phase polymerization reactor 5. The temperature of liquid flow in the supplying pipeline 4 is normally 230 to 260° C. The heat exchanger 3 may function as a heating device, when the temperature of liquid flow in supplying pipeline 2 is lower than that of the liquid-phase reactor 5. The heat exchanger 3 may also function as a cooling device, when the temperature of liquid flow in supplying pipeline 2 is higher than that of the liquid-phase reactor 5. For example, the polymerization reactor includes the two polymerization sections. The operation of heat exchanger 3 is dependent on the temperature of supplied esterfication product in the supplying pipeline 2. Practically, the heat exchanger 3 elevates the temperature of liquid flow, when the temperature of reactant in the first section is higher than 250° C. The heat exchanger 3 lowers the temperature of liquid flow, when the temperature of reactant in the first section is lower than 240° C. After passing through the heat exchanger 3, the reactant is supplied to the polymerization reactor. The polymerization reactor can be a tank-type reactor equipped with agitator, a column-type reactor without agitator, a reactor with a horizontal screw, and the like.

Figure 2:
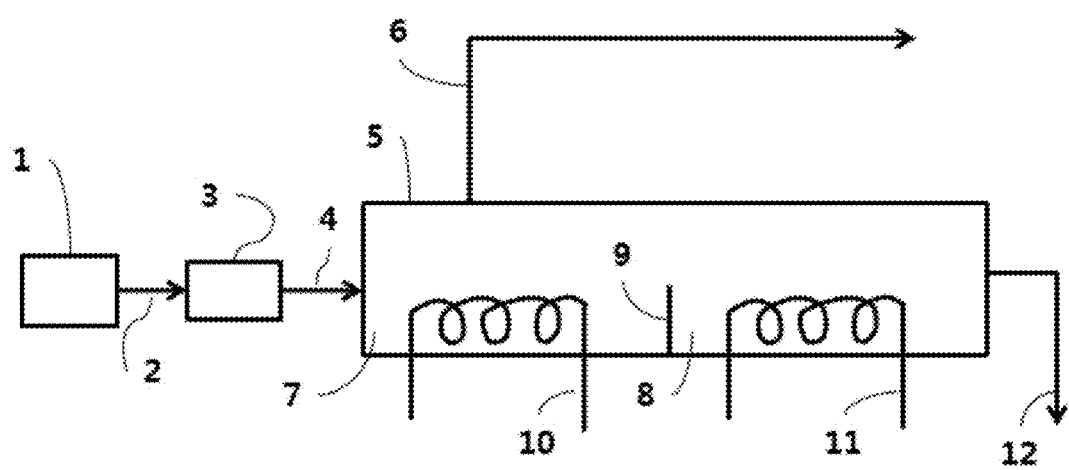
FIG. 2 is a schematic view depicting a process of preparing a polyester using a liquid-phase polymerization reactor with two polymerizing sections.
Figure 3:
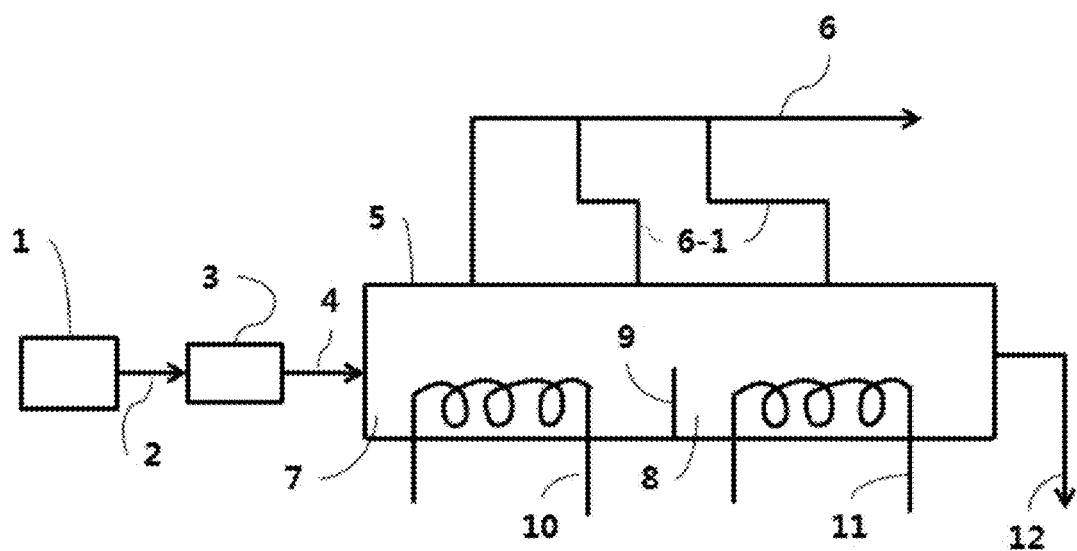
FIG. 3 is a schematic view depicting a process of preparing a polyester using a liquid-phase polymerization reactor with two polymerizing sections, a main pipeline for discharging gaseous byproduct, and a branched pipeline for discharging gaseous byproduct.

An embodiment of the present invention is shown in FIGS. 2 and 3. As illustrated in FIG. 2, the reactor includes two polymerization sections, one outlet of discharging the gaseous stream of byproduct and two heat exchangers. As illustrated in FIG. 3, the reactor includes two polymerization sections, one outlet of discharging the gaseous stream of byproduct which unifies at least two substream 6-1, and two heat exchangers.

In case of using the two polymerization sections, the reactant passing through the heat exchanger 3 is supplied for the first polymerization section 7, and the temperature of two divided sections can be controlled by the same heat exchanger or the separate heat exchanger. The heat exchanger 10, 11 can be equipped with interior coil and/or with exterior jacket. The two polymerization sections can be divided by the separating wall 9. The separating wall 9 can be anything to divide the reactant can be used in considering with the viscosity of reactant and agitation capacity. The separating wall 9 can be located at a separation distance from the exterior wall of reactor so as for the reactant to move in the reactor.

Because the liquid-phase polymerization product has a low viscosity in the first polymerization section, a tank-type reactor equipped with agitator and a column-type reactor without agitator can be used preferably. Because the liquid-phase polymerization product with a high viscosity is contained in the final polymerization section, a reactor with a horizontal screw can be used preferably to increase the surface area of the product. The reactor of the middle section between the first section and the final section can be selected regardless of the reactor types of the first section and the final section.

The byproduct produced in the liquid-phase polymerization reactor can be discharged to the outside of rector through the pipeline discharging the gaseous stream of byproduct 6. As illustrated in FIG. 2 and FIG. 3, the pipeline discharging the gaseous stream of byproduct can be divided to the branched pipeline 6-1. The final product can be discharged through the pipeline discharging the polyester 12.

The improved process of preparing the polyester and the reactor resolve the problems of conventional art which requires three steps of an esterification or trans-esterification, pre-polymerization and polymerization and a separate collecting device of byproduct, and which must control separately the temperature and the pressure of each step and. In addition, the process of the present invention can minimize the production of byproducts and eliminate the need for pre-polymerization used in the prior art, thereby reducing an equipment cost and achieving the simple operation of the polymerization process.

EXAMPLES

A better understanding of the present invention may be obtained through the following examples which are set forth to illustrate, but are not to be construed as limiting the present invention.

The acid value, the intrinsic viscosity, the water content and the conversion rate of polycarboxylic acid are measured or calculated according to the following methods.

(1) Acid Value 0.25 g of the completely-dried sample is dissolved in benzyl alcohol, added with chloroform and phenol red reagent at a room temperature, and titrated with 0.01 N KOH solution. The same procedure is applied to the blank solution without sample. The acid value is calculated according to mathematical formula 1.

$$\text{Acid Value}_{(meg/Kg)} = \frac{(A-B) \times 0.01 \times f}{W} \quad \text{[Mathematical formula 1]}$$

Wherein,

A is an amount of 0.01 N KOH solution added to a sample (μl),

B is an amount of 0.01 N KOH solution added to a blank (μl),

W is an amount of sample (g), and f is a factor of 0.01 N KOH solution.

(2) Intrinsic Viscosity (IV)

A sample is dissolved in a mixture of 60 wt % of phenol and 40 wt % of 1,1,2,2-tetrachloromethan solvent to be concentration of 0.25 g/50 ml, and the inherent viscosity is measured with Rheotek Glass Capillary viscometer according to ASTM D4603 at 30° C. Then, the intrinsic viscosity is calculated from the measured inherent viscosity according to Mathematical formulae 2 and 3.

$$\eta_{inh} = [\ln(t_s/t_0)]/C \quad \text{[Mathematical formula 2]}$$

Wherein

η inh is an inherent viscosity ln is a natural logarithm ts is the time for a sample to pass through a capillary, t0 is the time for blank (solvent) to pass through a capillary, and C is a concentration of sample per 100 ml of solvent (g).

$$\eta = 0.25(\eta_r - 1 + 3 \ln \eta_r)/C \quad \text{[Mathematical formula 3]}$$

Wherein

η is an intrinsic viscosity, and

η r is a relative viscosity (=ts/t0).

(3) Water Content

The water content is measured with Karl-Fischer apparatus.

(4) Conversion Rate of Polycarboxylic Acid $$\text{conversion rate} = \frac{\text{(equvalent amount of initial input polycarboxyilic acid equivalent amount of reacted polycarboxyilic acid)}}{\text{equvalent amount of initial input polycarboxyilic acid}} \times 100 \quad \text{[Mathematical formula 4]}$$

Figure 4:
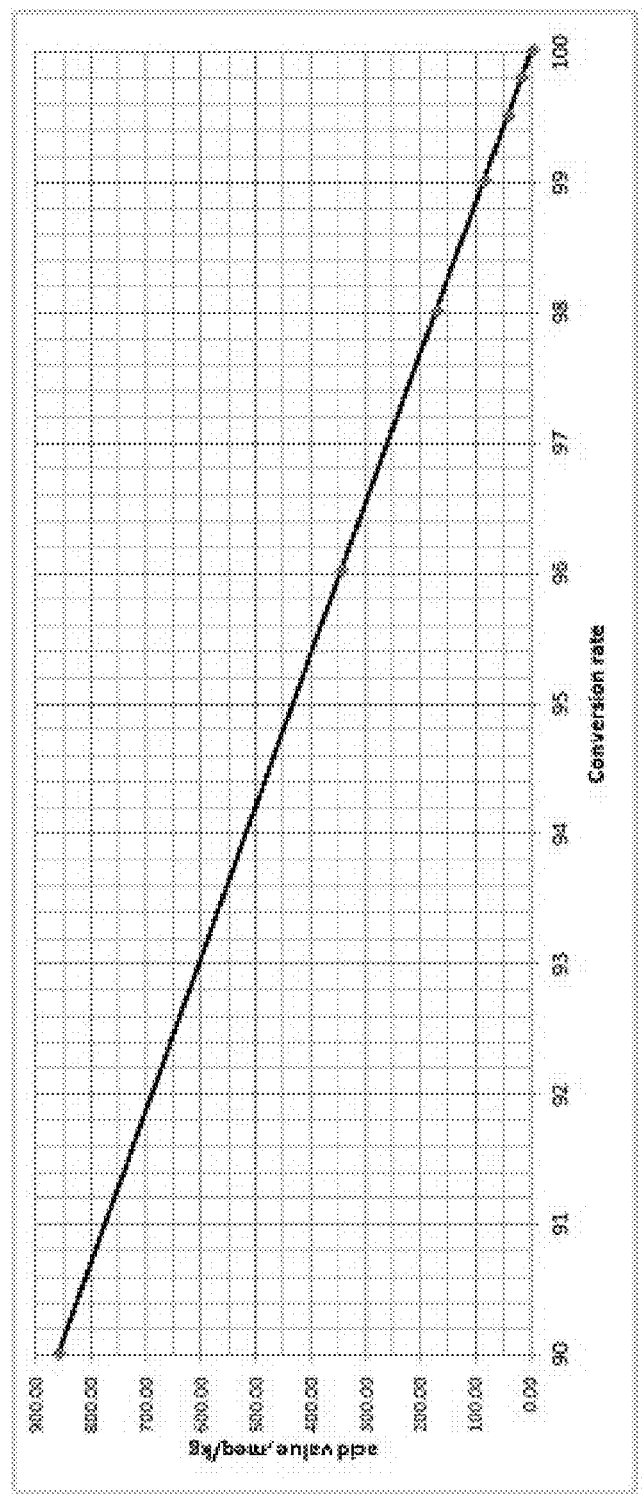
FIG. 4 is a graph showing the relationship between the conversion rate and the acid value of the esterification reaction product produced from terephthalic acid and 1,3-propandiol.

The relationship between the conversion rate and the acid value is shown in FIG. 4, when the molar ratio of 1,3-propandiol/terephthalic acid is 1.3 in the process of the present invention.

(5) Content of Cyclic Dimer and Dipropylene Glycol (DPG)

15 mg of sample is dissolved in 1 ml of NMR-measuring solvent [volume ratio of $CDCl_3$:TFA (substituted with deuterium)=5:1] and transferred to NMR tube. The proton analysis of sample in NMR tube was performed by 300 MHz NMR apparatus (Bruker AVANCE Digital). Then, the content of cyclic dimer in the sample (wt %) is calculated according to Mathematical formula 5, proviso that the specific gravities of the cyclic dimer and polyester PTT are the same. The content of DPG in a sample (mol %) is calculated according to Mathematical formula 5, where the standard for the proton analysis is the protons located at both terminal carbons of 1,3-PDO in the polymer chain, and the protons located at carbon atom being adjacent to the ether group of DPG.

$$A_{c\text{-}dimer} = \frac{A_{c\text{-}dimer}}{(A_{c\text{-}dimer} + A_{ptt})} \times 100 \quad \text{[Mathematical formula 5]}$$

Wherein, $A_{c\text{-}dimer}$ is a peak area of benzene ring of cyclic dimer in the vicinity of 7.65 ppm, and $A_{ptt}$ is a peak area of benzene ring of PTT in the vicinity of 8.1 ppm.

$$DPG = \frac{A_{DPG}}{(A_{DPG} + A_{1,3\text{-}PDO})} \times 100 \quad \text{[Mathematical formula 6]}$$

Wherein, $A_{1,3\text{-}PDO}$ is a peak area of the protons located on both terminal carbons of 1,3-PDO in the polymer chain in the vicinity of 4.5 to 4.6 ppm, and $A_{DPG}$ is a peak area of the protons located on carbon atom being adjacent to the ether group of DPG in the vicinity of 3.9 ppm.

(6) Content of Acrolein and Aryl Alcohol of the Condensing Product Derived from the Liquid-Phase Polymerization Product The condensed product is analyzed with a gas chromatography according the following analyzing conditions, and the relative response is measured by using butanol as standard material. The contents of acrolein and aryl alcohol (ppm) are calculated according to the following Mathematical formulae 7 and 8.

<Analyzing Condition>

1) Column—INNOWAX 30 m,

2) Inlet temperature—200° C.,

3) Detector—FID detector (detector temperature: 280° C.)

4) Gas flow—3 ml/min,
5) Resolution—10:1,
6) Oven temperature—60° C. (for 2 minutes)→elevating the temperature to 80° C. at 5° C./minutes→elevating the temperature to 240° C. at 20° C./minutes→240° C. (for 2 minutes)

$$\text{Content of acrolein}(ppm) = \frac{A_{arcolein}}{A_{std}} \times F_1 \quad \text{[Mathematical formula 7]}$$

$$\text{Content of allyalcohol}(ppm) = \frac{A_{allyalcohol}}{A_{std}} \times F_2 \quad \text{[Mathematical formula 8]}$$

In the Mathematical formulae 7 and 8,
$A_{arcolein}$ is a GC area of acrolein,
$A_{allyl\ alcohol}$ is GC area of aryl alcohol,
$A_{std}$ is a GC area of standard material,
F1 is a GC response factor of acrolein, and
F2 is a GC response factor of aryl alcohol.

Example 1

1-1. Preparation of Reaction Product with Low Acid Value Containing Ester Oligomer 215.97 g of terephthalic acid and 128.59 g of 1,3-propandiol were added to 500 mL of a glass reactor equipped with an agitator for reaction product; a column packed with a filling material of removing produced water and refluxing the polyhydric alcohol to the reactor; a thermometer of measuring the temperature of the reacting material and the vapor discharged from the packed column, vacuum pump; and a heating mantle of the reacting material, were heated with agitating at an atmosphere of nitrogen to elevate the reaction temperature.

When the temperature of reacting material reached 200° C., 191 mg of titanium butoxide (Ti—OBu$_4$) catalyst was added to the reactor, and the esterification reaction was initiated with elevating the temperature to 250° C. The voltage of heating mantle was controlled to adjust temperature of vapor discharged from the packed column to 100° C. or lower. After adding the catalyst, the reacting material became transparent in three hours later. The reaction was continued for additional 1 hour, and then quenched. As a result, the acid value was 55 meq/Kg and the conversion rate of terephthalic acid was 99.4%.

1-2 Production of Polyester

The esterification product obtained in the Example 1-1 was used for the polymerization without performing the pre-polymerization reaction. 140 g of esterification product obtained in Example 1-1, and 71 mg of titanium butoxide (Ti—OBu4) were added to 500 mL of a glass reactor equipped with an agitator, a thermometer, an outlet of discharging the gaseous byproduct, a condensing and collecting device, and a heating mantle, and then were adjusted to a temperature of 250° C. with agitating at 250 rpm. When the temperature of reacting material reached 250° C., the vacuum pump with 0 torr adjustment began operation. At the same time of operating the vacuum pump, the initial temperature of condensed material was 60 to 80° C., because of unreacted 1,3-propandiol and a small amount of water contained in the esterification reaction product were evaporated and discharged. After about 4 minutes, the temperature of condensed material was decreased to 20° C. or lower, and after 4 minutes 30 seconds, the pressure of 0 torr was maintained stably. If the pressure of 0 torr was maintained stably, additional 140 g of esterification product was continuously added to the reactor for 30 minutes with maintaining 250° C. of the reacting material. After continuously supplying the esterification product for 30 minutes, the reaction pressure was maintained as 1 to 3 torr.

Example 2

The esterification product was prepared according to the same method of Example 1-1.

The esterification product obtained in the Example 1-1 was used for the polymerization without performing a pre-polymerization reaction. 140 g of esterification product obtained in the Example 1-1, and 71 mg of titanium butoxide (Ti—OBu4) were added to the same reactor of Example 1-2, and then were adjusted to a temperature of 220° C. with agitating at 250 rpm according to the substantially same method of Example 1-2. When the temperature of reacting material reaction reached 220° C., the vacuum pump with 0 torr adjustment began operation. At the same time of operating the vacuum pump, the initial temperature of condensed material was 60 to 80° C., because of unreacted 1,3-propandiol and a small amount of water contained in the esterification reaction product were evaporated and discharged. After about 4 minutes, the temperature of condensed material was decreased to 20° C. or lower, and after 4 minutes 20 seconds, the pressure of 0 torr was maintained stably. If the pressure of 0 torr was maintained stably, additional 140 g of esterification product was continuously added to the reactor for 30 minutes with elevating the temperature of 220° C. to 250° C. of the reacting material. After continuously supplying the esterification product for 30 minutes, the reaction pressure was maintained as 1 to 3 torr.

Example 3

3-1. Preparation of Esterification Reaction Product

The esterification reaction was prepared according to the same method of Example 1-1, except that additional 10 g of PDO was added, reacted for 1 hour and then quenched, when the reacting material became transparent after adding the catalyst in 3 hours. As a result, the acid value of the reaction product was 15 meq/Kg and the conversion rate was 99.8%.

3-2. Production of Polyester

The esterification product obtained in the Example 3-1 was used for the polymerization without performing the prepolymerization reaction. 140 g of esterification product obtained in the Example 3-1, and 71 mg of titanium butoxide (Ti—OBu4) were added to the same reactor of Example 1-2, and then were adjusted to a temperature of 220° C. with agitating at 250 rpm according to the substantially same method of Example 1-2. When the temperature of reacting material reaction reached 220° C., the vacuum pump with 0 torr adjustment began operation. After about 4 minutes, the pressure of 0 torr was maintained stably. If the pressure of 0 torr was maintained stably, additional 140 g of esterification product was continuously added to the reactor for 30 minutes with elevating the temperature of 220° C. to 250° C. of the reacting material. After continuously supplying the esterification product for 30 minutes, the reaction pressure was maintained as 0 to 2 torr.

Example 4

4-1: Production of Batch-Type Esterification Product

The esterification reaction was performed with two steps. As the first step reaction, 215.97 g of terephthalic acid and 128.59 g of 1,3-propandiol were added to 500 mL of a glass reactor of Example 1-1, and were heated with agitating at the atmosphere of nitrogen to gradually elevate the reaction temperature. When the temperature of reacting material reached 200° C., 191 mg of titanium butoxide (Ti—OBu4) catalyst was added to the reactor, and the esterification reaction was initiated and continued with elevating the temperature to 250° C. The voltage of heating mantle was controlled to adjust temperature of vapor from the packed column to 100° C. or lower during the reaction.

As the second esterification reaction, when the reacting material began to be transparent after adding the catalyst in 3 hours (acid value is 480 meq/kg), the vacuum pump began operation to adjust the reaction pressure to 350 to 400 torr. Then, the reaction was continued for 30 minutes and stopped. As a result, the acid value was 50 meq/Kg. The result confirmed that the esterification was performed rapidly by the low pressure condition.

4-2: Production of Polyester

The esterification product obtained in the Example 4-1 was used for the polymerization without performing the pre-polymerization reaction. 140 g of esterification product obtained in the Example 4-1, and 71 mg of titanium butoxide (Ti—OBu4) were added to the same reactor of Example 1-2, and then were adjusted to a temperature of 220° C. with agitating at 250 rpm according to the substantially same method of Example 1-2. When the reaction temperature reached 220° C., the vacuum pump adjusted to 0 torr began operation. After about 4 minutes, the pressure of 0 torr was maintained stably. While the pressure of 0 torr was maintained stably, additional 140 g of esterification product was continuously added to the reactor for 30 minutes with elevating the temperature of 220° C. to 250° C. of the reacting material. After continuously supplying the esterification product for 30 minutes, the reaction pressure was maintained as 0 to 2 torr.

Example 5

5-1: Continuous Preparation of Esterification Reaction Product

The continuous esterification reactor for this example was the reactor of Example 1-1 equipped with an additional overflow line which made the raw materials input continuously and the product be discharged continuously from the reactor.

Firstly, 215.97 g of terephthalic acid and 128.59 g of 1,3-propandiol were added to the reactor, and were heated with agitating at the atmosphere of nitrogen to gradually elevate the reaction temperature. When the temperature of the reaction materials reached 200° C., 191 mg of titanium butoxide (Ti—OBu4) catalyst was added to the reactor, and the esterification reaction was initiated and continued with elevating the temperature to 250° C. The voltage of heating mantle was controlled to adjust temperature of vapor from the packed column to 100° C. or lower during the reaction. The esterification reaction was performed continuously at normal atmospheric pressure, until the reacting material became transparent after adding the catalyst in 3 hours. The reaction product with 480 meq/kg was obtained in the esterification under the normal atmospheric pressure.

300 g of the reaction product was added to the continuous esterification reactor, and was adjusted to 250° C. of the reaction temperature. Then, terephthalic acid, 1,3-propandiol and titanium butoxide were added continuously at the feeding rates of 53.4 g/hr, 31.8 g/hr, and 47 uL/hr, respectively. After 30 minutes, the discharging rate of overflow line was maintained stably at 74.1 g/hr and the temperature of upper part of column for removing the water selectively was maintained at 100° C. After 8 hours of reaction, the first esterification reaction product obtained in the first step was 420 meq/kg.

In the second esterification reaction, 100 g of the first esterification reaction product obtained in Example 4-1 was added to the same reactor used above, and then were adjusted to a temperature of 250° C. and maintained to the pressure of 290-310 Torr by operating the vacuum pump. If the temperature and the pressure were maintained stably, the first esterification reaction product obtained above was preheated to 230 to 250° C. and added to the second esterification reactor at a feeding rate of 74.1 g/hr. After about 30 minutes, the measurement and comparison of the weight of product showed that the product was discharged at a stable rate of 73.7 g/hr. The temperature in the upper part of column was maintained stably at 95° C. or lower and the water produced in the reaction was smoothly discharged. After 8 hours of reaction, the acid value of product was 35 meq/kg.

To stabilize the continuous reaction, the reaction product obtained from the esterification reaction under the normal atmospheric pressure was added to the first esterification step because of the high acid value of product, and the esterification reaction product of Example 4-1 was added to the second step because of its low acid value. The esterification reaction product added to the initial stage of reaction was not limited particularly, because the reaction was stabilized after about 8 hours of the continuous reaction without being affected by the initial esterification reaction product. The result confirmed that the continuous esterification including the two steps performed under the different pressure conditions produced the product with stable acid value.

5-2: Production of Polyester

As the same liquid-phase polymerization as the method of Example 4-2, the esterification product obtained in the Example 5-1 was used for the polymerization according to the substantially same method of 4-2.

Example 6

6-1: Preparation of Esterification Reaction Product

In the first esterification reaction, 215.97 g of terephthalic acid and 128.59 g of 1,3-propandiol were added to 500 mL glass reactor of Example 1-1, and were heated with agitating at the atmosphere of nitrogen to gradually elevate the reaction temperature. When the temperature of reacting material reached 200° C., 191 mg of titanium butoxide (Ti—OBu$_4$) catalyst was added to the reactor, and the esterification reaction was initiated and continued with elevating the temperature to 250° C. The voltage of heating mantle was controlled to adjust temperature of vapor from the packed column to 100° C. or lower during the reaction. When the reacting material begun to be transparent (acid value of 482 meq/kg) after adding the catalyst in 3 hours, the reaction materials were maintained at a pressure of 290-310 Torr by operating the vacuum pump and then the esterification reaction was performed for 30 minutes.

Then, the reaction pressure was adjusted to 150 to 200 torr, and the reaction was continued for 10 minutes and stopped. As a result, the acid value of the reaction product obtained after the first reaction under the first reduced pressure was 76 meq/Kg and the acid value of the reaction product obtained after the second reaction under the reduced pressure was 35 meq/Kg.

6-2: Production of Polyester

The esterification product obtained in the Example 6-1 was used for the polymerization according to the substantially same method of 4-2.

Example 7

7-1: Preparation of Esterification Reaction Product

The esterification product was prepared according to the same method of Example 1-1.

Specifically, 415.3 g of terephthalic acid and 247.3 g of 1,3-propandiol were added to 500 mL of a glass reactor of Example 1-1, and were heated with agitating at the atmosphere of nitrogen to elevate the reaction temperature. When the temperature of the reaction materials reached 200° C., 366 mg of titanium butoxide (Ti—OBu$_4$) catalyst and 51.6 mg of Magnesium hydroxide were added to the reactor, and the esterification reaction was initiated and continued with elevating the temperature to 250° C. The voltage of heating mantle was controlled to adjust temperature of vapor from the packed column to 100° C. or lower during the reaction. The reaction materials began to be transparent (acid value of 482 meq/kg) after adding the catalyst in 3 hours, and the esterification reaction was further performed for 1 hour and stopped. The acid value of intermediate reaction product was 226 meq/Kg and the conversion rate of terephthalic acid was 97.4%, the content of cyclic dimer was 1.7 wt %, and the content of DPG was 1.15.

Then, the reaction pressure was adjusted to 350 to 400 torr, and the reaction was continued for 30 minutes and stopped. As a result, the acid value of esterification product was 45 meq/Kg.

7-2. Production of Polyester

As a liquid-phase polymerization, the esterification product obtained in the Example 7-1 was used for the polymerization according to the substantially same method of 4-2.

Example 8

8-1: Preparation of Esterification Reaction Product

The esterification reaction product was obtained by performing the esterification reaction according to the substantially same method of Example 7-1, except that 26 mg of NaOH was used instead of Mg(OH)$_2$. The acid value of esterification reaction product was 251 meq/Kg, the conversion rate of terephthalic acid was 97.1%, the content of cyclic dimer was 1.7 wt %, and the content of DPG was 1.28.

Then, the reaction pressure was adjusted to 350 to 400 torr, and the reaction was continued for 30 minutes and stopped. As a result, the acid value of esterification product was 47 meq/Kg.

8-2. Production of Polyester

As a liquid-phase polymerization, the esterification product obtained in the Example 8-1 was used for the polymerization according to the substantially same method of 4-2.

Comparative Example 1

1-1 Preparation of Esterification Reaction Product

The esterification product was prepared according to the same method of Example 1-1, except that the reaction was stopped when the reacting material was transparent after adding the catalyst in 3 hours. The acid value of product was a high acid value of 300 meq/Kg and the conversion rate was 97.3%.

1-2 Production of Polyester 140 g of esterification product obtained in the Comparative Example 1-1, and 71 mg of titanium butoxide (Ti—OBu4) were added to the same reactor of Example 1-2, and were adjusted to a temperature of 220° C. with agitating at 250 rpm. When the temperature of reacting material reaction reached 220° C., the vacuum pump adjusted to 0 torr began operation. After starting the operation of vacuum pump in about 15 minutes, the pressure of 0 torr was maintained stably. If the pressure of 0 torr was maintained stably, additional 140 g of esterification product was continuously added to the reactor for 30 minutes with elevating the temperature of 220° C. to 250° C. of the reacting material. The reaction pressure was 7 to 15 torr and could not be controlled to a high-degree vacuum of 5 torr or lower. The result showed that the low conversion rate of esterification reaction could not achieve the high-degree vacuum.

Comparative Example 2

2-1. Preparation of Esterification Reaction Product

The esterification product was prepared according to the same method of Example 1-1, except that the reaction was stopped after adding the catalyst in 30 minutes. The acid value of reaction product was 100 meq/Kg and the conversion rate was 98.8%.

2-2. Production of Polyester 140 g of esterification product obtained in the Comparative Example 2-1, and 71 mg of titanium butoxide (Ti—OBu4) were added to the same reactor of Example 1-2, and were adjusted to a temperature of 220° C. with agitating at 250 rpm. When the temperature of reacting material reaction reached 220° C., the vacuum pump adjusted to 0 torr began operation. After starting the operation of vacuum pump in about 8 minutes, the pressure of 0 torr was maintained stably. If the pressure of 0 torr was maintained stably, additional 140 g of esterification product was continuously added to the reactor for 30 minutes with elevating the temperature of 220° C. to 250° C. of the reacting material. The reaction pressure was changed to 3 to 8 torr and could not be controlled to a high-degree vacuum of 5 torr or lower.

The experimental results of Examples and the Comparative Examples are summarized in Table 1.

TABLE 1

| Clasffication | Preparation of ester oligomer | | Preparation of polyester | |
|---|---|---|---|---|
| | Reaction time (hour) | Acid value (meq/kg) | Time required for achieving 0 torr | The pressure (torr) at the continuous feeding |
| Example 1 | 4 | 55 | 4 min 30 sec | 1-3 |
| Example 2 | 4 | 53 | 4 min 20 sec | 1 to 3 |
| Example 3 | 4 | 15 | 4 min | 0 to 2 |
| Example 4 | 3.5 | 50 | 4 min | 0 to 2 |
| Example 5 | Continuous Reaction | 35 | 4 min | 0 to 2 |
| Example 6 | 3.75 | 35 | 4 min | 0 to 2 |
| Example 7 | 4.5 | 45 | 4 min | 0 to 2 |
| Example 8 | 4.5 | 47 | 4 min | 0 to 2 |
| Comparative Example 1 | 3 | 300 | 15 min | 7 to 15 |
| Comparative Example 2 | 3.5 | 100 | 8 minutes | 3 to 8 |

As described above, when the esterification reaction product with a low acid value is capable of approaching the high-degree vacuum at a short time, the esterification reaction product can be applied directly to the polymerization under the high-degree vacuum without performing the pre-polymerization. On the other hand, when the esterification reaction product with a high acid value requires a long time for approaching the high-degree vacuum, the additional pre-polymerization step is be needed. In addition, the reaction pressure was maintained to be high level, so that the byproducts could not removed easily, when the continuous feeding of esterification reaction product to the liquid-phase polymerization reactor. Thus, in case that the esterification reaction product with a high acid value was used in the polymerization reaction, it is difficult to obtain the polyester with a high intrinsic viscosity.

Example 9

The esterification product was prepared according to the same method of Example 1-1.

140 g of the esterification product and 71 mg of titanium butoxide (Ti—OBu4) were added to the same reactor of Example 1-2, and were adjusted to a temperature of 250° C. with agitating at 250 rpm. When the temperature of reacting material reaction reached 250° C., the vacuum pump adjusted to 0 torr began operation. After starting the operation of vacuum pump in about 4 minutes 30 seconds, the pressure of 0 torr was maintained stably. Then, additional 140 g of esterification product was continuously added to the reactor for 30 minutes with maintaining 250° C. After continuously supplying the esterification product for 30 minutes, the reaction pressure was maintained as 1 to 3 torr. After supplying the esterification product, the reacting materials were heated to 260° C. and the reaction was performed additionally for 60 minutes under a pressure of 3 torr or lower, with reducing the agitating speed of 200 rpm to 30 rpm. The intrinsic viscosity (IV) of the produced polyester was 0.75, and the water content of the condensed byproducts was 1.5 wt %.

Example 10

The esterification product was prepared according to the same method of Example 2-1.

140 g of the esterification product and 71 mg of titanium butoxide (Ti—OBu4) were added to the same reactor of Example 1-2, and were adjusted to a temperature of 220° C. with agitating at 250 rpm. When the temperature of reacting material reaction reached 220° C., the vacuum pump adjusted to 0 torr began operation. After starting the operation of vacuum pump in about 4 minutes 20 seconds, the pressure of 0 torr was maintained stably. Then, additional 140 g of esterification product was continuously added to the reactor for 30 minutes with elevating the temperature of 220° C. to 250° C. After continuously supplying the esterification product for 30 minutes, the reaction pressure was maintained as 1 to 3 torr. After supplying the esterification product, the reacting materials were heated to 260° C. and the reaction was performed additionally for 60 minutes under a pressure of 3 torr or lower, with reducing the agitating speed of 200 rpm to 30 rpm. The intrinsic viscosity (IV) of the produced polyester was 0.8, and the water content of the condensed byproducts was 1.48 wt %.

Example 11

The esterification product was prepared according to the same method of Example 3-1.

140 g of the esterification product, and 71 mg of titanium butoxide (Ti—OBu4) were added to the same reactor of Example 1-2, and were adjusted to a temperature of 220° C. with agitating at 250 rpm. When the temperature of reacting material reaction reached 220° C., the vacuum pump adjusted to 0 torr began operation. After starting the operation of vacuum pump in about 4 minutes, the pressure of 0 torr was maintained stably. Then, additional 140 g of esterification product was continuously added to the reactor for 30 minutes with elevating the temperature of 220° C. to 250° C. After continuously supplying the esterification product for 30 minutes, the reaction pressure was maintained as 0 to 2 torr. After supplying the esterification product, the reacting materials were heated to 260° C. and the reaction was performed additionally for 60 minutes under a pressure of 2 torr or lower, with reducing the agitating speed of 200 rpm to 30 rpm. The intrinsic viscosity (IV) of the produced polyester was 0.82, and the water content of the condensed byproducts was 0.4 wt %.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A process of continuous production for polyester, comprising continuously supplying an esterification or transesterification product comprising ester oligomers with an acid value of less than 100 meq/kg to a liquid phase polymerization reactor, wherein the esterification or transesterification product is produced by esterification or transesterification of a polycarboxylic acid or an alkyl ester thereof and a polyhydric alcohol;
   and performing a liquid-phase polymerization at a temperature of 200 to 270° C. and at a pressure of 0 to 5 torr in a liquid-phase polymerization reactor to produce the polyester with an intrinsic viscosity of 0.4 dl/g or higher,
   wherein the temperature of the liquid-phase polymerization reactor increases gradually from an inlet to an outlet of the reactor;
   wherein the liquid-phase polymerization reactor comprises at least two polymerizing reaction sections that include a first section carrying out the polymerization at a temperature of 200 to 260° C. and a second section carrying out polymerization at a temperature of 250 to 270° C.

2. The process of continuous production for polyester according to claim 1, wherein a gaseous byproduct with a water content of 1.5 wt % or lower is removed from the liquid-phase polymerization reactor.

3. The process of continuous production for polyester according to claim 1, wherein the first section corresponds to a region at the inlet occupying 30 to 50 vol % of reactor per total volume of reactor and the second section corresponds to a region at the outlet occupying 50 to 70 vol% from the outlet of reactor per total volume of reactor.

4. The process of continuous production for polyester according to claim 1, wherein the same pressure conditions are applied in the first section and the second section.

5. The process of continuous production for polyester according to claim 1, wherein the esterification or transesterification product is produced by reacting the polycarboxylic acid or an alkyl ester compound thereof with the polyhydric alcohol at a molar ratio of 1:1.1 to 1:2.

6. The process of continuous production for polyester according to claim 1, wherein the conversion rate of polycarboxylic acid or an alkyl ester thereof is 99% or higher in the esterification or trans-esterification.

7. The process of continuous production for polyester according to claim 1, wherein the esterification or transesterification is carried out at a temperature of 150 to 260° C. for 1 hour to 5 hours.

8. The process of continuous production for polyester according to claim 1, wherein the esterification or transesterification product has an intrinsic viscosity of 0.05 to 0.4 dL/g.

9. The process of continuous production for polyester according to claim 1, wherein the esterification or transesterification product having an acid value of less than 100 meq/kg is obtained by the esterification or trans-esterification reaction which comprises at least two steps including a first step of esterification or trans-esterification performed at a pressure of 1 to 5 atm to produce a first product having an acid value of 200 to 1,500 meq/kg, and a second step of esterification or trans-esterification performed at a pressure of 50 to 500 ton, to produce the esterification or transesterification product having an acid value of less than 100 meq/kg.

10. The process of continuous production for polyester according to claim 9, wherein the esterification or transesterification product obtained after the second step has an acid value of 50 meq/kg or lower.

11. The process of continuous production for polyester according to claim 9, wherein the first step and the second step further comprise a step of removing a byproduct of water, alcohol, or both from reactor.

12. The process of continuous production for polyester according to claim 9, wherein the second step is divided into at least two reactions having a pressure gradient.

13. The process of continuous production for polyester according to claim 12, wherein the pressure is reduced during the second step from a pressure of 350 to 500 torr to a pressure of 50 to 350 torr.

14. The process of continuous production for polyester according to claim 1, wherein the esterification or transesterification is carried out in the presence of at least one metal selected from the group consisting of alkaline metals and alkaline earth metals.

15. The process of continuous production for polyester according to claim 9, wherein the esterification or transesterification is carried out in the presence of at least one metal selected from the group consisting of alkaline metals and alkaline earth metals.

16. The process of continuous production for polyester according to claim 14, wherein the metal is at least one selected from the group consisting of Mg, Ca, K and Na.

17. The process of continuous production for polyester according to claim 14, wherein the esterification or transesterification product contains 2 mol % or less of diproplyeneglycol (DPG) per mole of polyhydric alcohol in the product.

* * * * *